Feb. 21, 1933.  E. B. LINTON  1,898,734
CALIBRATING APPARATUS FOR LIQUID TANKS
Filed Nov. 25, 1931
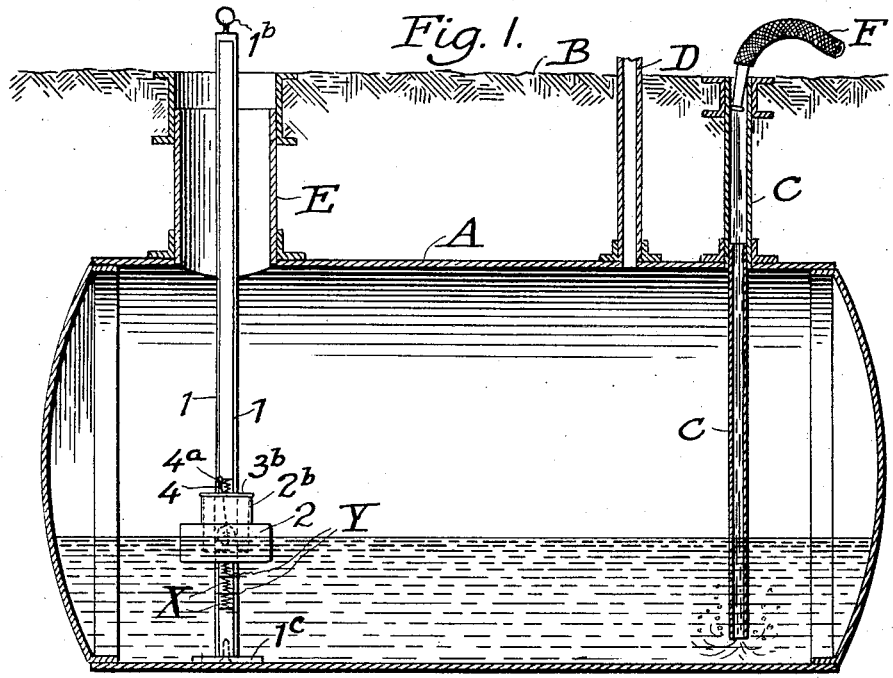
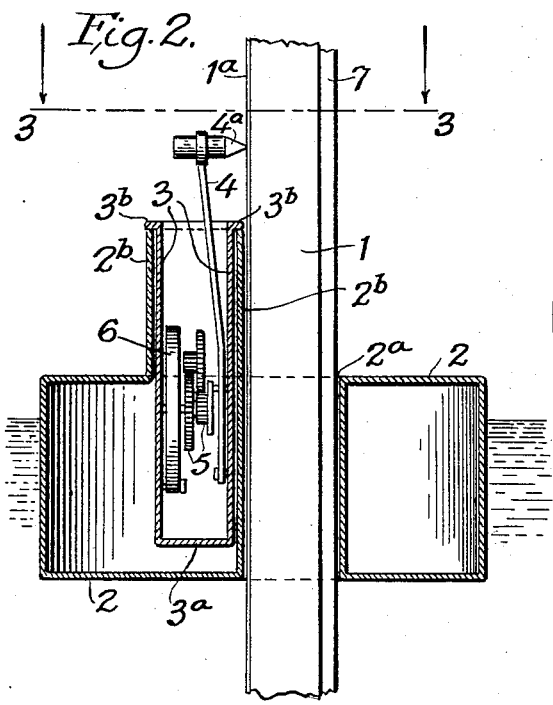
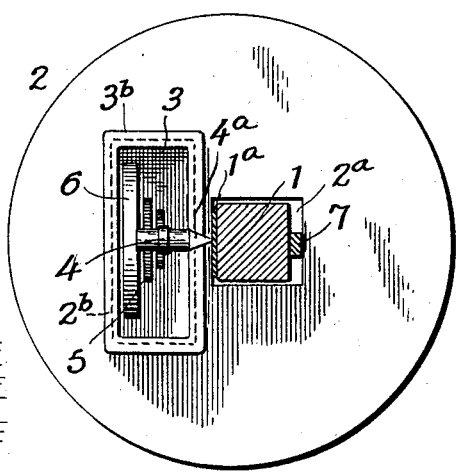
Earl B. Linton, Inventor
By Alexander Dowell, Attorneys Patented Feb. 21, 1933

1,898,734

UNITED STATES PATENT OFFICE

EARL BRYANT LINTON, OF RIO DE JANEIRO, BRAZIL

CALIBRATING APPARATUS FOR LIQUID TANKS

Application filed November 25, 1931. Serial No. 577,360.

This invention is a novel calibrating apparatus for liquid tanks of all kinds, and the principal object of the invention is to provide a novel apparatus comprising a float slidably mounted upon a gauge stick, the float being adapted to rest upon the surface of the liquid in the tank, and carrying an oscillating arm holding a pencil or other marking instrument adapted to mark the various liquid levels upon one face of the gauge stick as the tank is being filled, the arm being oscillated by suitable spring or other mechanism, similar to the well known metronome, removably mounted upon the float, whereby the various levels of the liquid corresponding with amounts successively poured into the tank during filling will be calibrated directly upon the gauge stick. The apparatus is designed primarily for use, when the tank is being filled for the first time, in making the necessary gauge stick, but obviously is not of necessity limited or restricted to such use.

Another object of the invention is to provide a calibrating apparatus consisting of a float carrying an arm oscillating mechanism removable as a unit from the float when it is desired to wind the main spring of the mechanism.

A still further object of the invention is to provide the gauge stick with a sliding wedge adapted to bind the float to the stick thereby avoiding defacement of the calibrations on the stick when removing the apparatus from the tank.

Other minor objects will be hereinafter set forth.

I will explain the invention with reference to the accompanying drawing which illustrates one practical embodiment thereof to enable others to adopt and use the same; and will summarize in the claims the novel features of construction, and novel combinations of parts, for which protection is desired.

In said drawing:

Fig. 1 is a section showing an underground liquid tank with my novel calibrating apparatus in operative position during the filling operation;

Fig. 2 is an enlarged vertical section through the float and arm oscillating mechanism;

Fig. 3 is an enlarged section on the line 3—3, Fig. 2.

In the drawing the tank A for holding or storing gasoline, fuel oil, or any other liquids, is shown embedded below the ground surface B, and provided with the usual filling pipe C, and a vent pipe D, in the usual manner, and also provided with a gauging pipe E. Pipes C and E may be provided with the usual closure plugs (not shown) of any type when not in use. Such embedded tanks are not standard, and moreover are usually constructed non-rectangular in cross-section, and the cubical contents for any liquid level therefore cannot be readily ascertained as the diameters, lengths, and shapes of the end plates of the tanks vary. When the tank is being filled for the first time a gauge stick 1 must necessarily be calibrated so that by lowering the gauge stick 1 down through the gauge opening E the contents for any liquid level may be readily ascertained.

My novel calibrating apparatus comprises a gauge stick 1 preferably of rectangular cross-section and of sufficient length to reach to the bottom of tank A when inserted down through the gauging pipe E. The gauge stick 1 is preferably made of wood but may be made of other suitable material. If made of wood, a strip of paper $1^a$ is preferably attached to the face of the stick upon which the markings are to be made, whereby the levels of the liquid for the various quantities poured in through the filling hose F may be readily calibrated thereon, as hereinafter described. An eyelet $1^b$ may be provided in the top of the gauge stick 1; and upon the bottom of the stick 1 is screwed or otherwise secured a plate $1^c$ to prevent the float 2 from dropping off the lower end of the stick while the stick is being lowered into or removed from the tank.

Slidably mounted upon the gauge stick 1 is a float casing 2, adapted to float upon the surface of the liquid, said casing 2 being sufficiently small in diameter to pass in and out of the gauging pipe E, whereby the assembled float and stick may be inserted into the tank. An offset opening $2^a$ in the float 2, is provided for the passage of the gauge stick 1, which opening is somewhat larger than the gauge stick but of same shape as the cross-section of the stick to permit the float casing 2 to readily slide but not rotate upon the gauge stick.

Upon the upper face of the float 2 adjacent the opening 2$^a$ is an upstanding hollow portion 2$^b$, open at its upper end and preferably of rectangular cross-section, said portion 2$^b$ being adapted to removably receive and support the arm oscillating mechanism inserted as a unit therein downwardly through the open upper end, said oscillating mechanism closing the upper end of the float portion 2$^b$.

The oscillating mechanism is housed in a removable casing 3 of rectangular cross-section, closed at its bottom by a plate 3$^a$, but having its upper edges flanged outwardly as at 3$^b$ to rest upon the upper edge of portion 2$^b$ of the float and thereby properly position the removable casing 3 in the float.

Within the removable casing 3 is an oscillating arm 4 adapted to oscillate across the face of the gauge stick 1 or paper strip 1$^a$ which is to receive the markings, the arm 4 being preferably operated by a gear-train denoted generally by the numeral 5 receiving motion by spring means 6 contained in the casing 3, which spring means 6 is or may be similar to the well known metronome mechanism used in teaching piano-forte. The gear-train 5 and spring 6 is not shown herein in detail as such mechanisms are well known in the art. When it is desired to wind the spring means 6 the removable casing 3 may be lifted out of the float 2. The arc of swing of the arm 4 should be less than the width of the face of stick 1 or paper strip 1$^a$; and the outer end of the swinging arm 4 carries a pencil or other scriber 4$^a$ adapted to mark upon the strip of paper 1$^a$, or directly upon the wood or metal face of the gauge stick 1 as the arm swings back and forth. If gauge stick 1 is made of metal, the marking thereon may be done with a hardened scriber of metal or other material.

I preferably provide a sliding wedge 7 on the face of gauge stick 1 opposite from that receiving the markings by pencil 4$^a$; which wedge is thicker at its upper end than at its lower end, whereby when the wedge 7 is pushed downwardly relatively to stick 1 the thicker upper portion of the wedge 7 will bind the float 2 against the stick 1 and lock same thereto as in Fig. 3, whereby the stick 1 and float 2 may be removed from the tank A without permitting the oscillating pencil 4$^a$ to deface the calibrations made on the stick. The wedge 7 may however be omitted if desired.

In operation, the guide stick 1 with the float 2 carrying the oscillating arm mechanism mounted thereon is inserted through the gauging pipe E. The float 2 will always rest on the surface of the liquid therein, and the calibrating operation is started by setting the oscillating arm 4 in motion, and by pouring into tank A through hose F, inserted in the filling opening C, a predetermined quantity of liquid. The oscillating arm 4 carrying the scriber 4$^a$ will mark transverse arcuate lines across the face of the gauge stick 1 or paper strip 1$^a$ as shown in Fig. 1. While the liquid is being poured into the tank, and the level of the liquid therein constantly rising, the lines marked on the gauge stick by the scriber 4$^a$ will be thin and zig-zag as shown at X in Fig. 1, but when each measured quantity of liquid, poured into the tank, comes to rest and during the short intervals between successive filling operations the lines will be superimposed and the pencil 4$^a$ will substantially retrace the same arc, and hence the heights for the measured quantities poured in may be readily denoted by the much heavier lines indicated at Y, Fig. 1. After the tank has been filled the float 2 may be locked to the gauge stick by manipulating the wedge 7, and the gauge stick 1, with the float 2, withdrawn from the gauging pipe E, and the heavy lines Y permanently marked to calibrate the measured quantities of liquid, or the gauge stick 1 may be used to transfer the information to a permanent gauge stick, proper connection being made for the normal height of the swinging pencil 4$^a$ above the liquid level.

Obviously the apparatus, while designed primarily for use in calibrating the gauge stick when the tank is being filled for the first time, may be used for other purposes.

I claim:

1. A liquid level calibrating apparatus comprising a gauge stick, a float adjacent the stick, and an oscillating scriber carried by the float adapted to mark upon the stick.

2. A liquid level calibrating apparatus comprising a gauge stick, a float guided by the stick, and an oscillating scriber carried by the float adapted to mark upon the face of the stick.

3. A liquid level calibrating apparatus comprising a gauge stick, a float casing having an opening slidably receiving the stick, and an oscillating scriber carried by the float adapted to mark upon the face of the stick.

4. A liquid level calibrating apparatus comprising a gauge stick adapted to be inserted in the liquid; a float casing adjacent the stick; an oscillatory arm adapted to mark upon the stick; and means on the float for oscillating the arm.

5. A liquid level calibrating apparatus comprising a gauge stick adapted to be inserted in the liquid; a float casing having an opening slidably receiving the stick; an oscillatory arm having a scriber adapted to mark upon the stick; and spring operated means carried by the float for oscillating the arm.

6. In a liquid level calibrating apparatus;

a float casing; an oscillatory arm having a scriber, and a spring motor carried by the float for oscillating the arm.

7. In apparatus as set forth in claim 6, said float casing having an opening therein adjacent the arm for the purpose specified.

8. In a liquid level calibrating apparatus, a float casing; an upstanding portion having an open upper end; a removable casing in said upstanding portion; an oscillatory arm carrying a scriber mounted in the removable casing; and spring means for oscillating the arm carried by the removable casing.

9. In apparatus as set forth in claim 8, said float casing having an opening therein adjacent the arm for the purpose specified.

EARL BRYANT LINTON.